US012754727B2

(12) United States Patent
Behm et al.

(10) Patent No.: US 12,754,727 B2
(45) Date of Patent: Oct. 6, 2026

(54) MIGRATION FROM CENTRALIZED VERSION CONTROL SYSTEM TO A DISTRIBUTED VERSION CONTROL SYSTEM

(71) Applicant: INTERNATIONAL BUSINESS MACHINES CORPORATION, Armonk, NY (US)

(72) Inventors: Dennis Behm, Langen (DE); Mathieu Dalbin, Viarmes (FR); Nicolas Dangeville, Paris (FR); Rahamim Katan, Modiin (IL)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 18/306,445

(22) Filed: Apr. 25, 2023

(65) Prior Publication Data

US 2024/0362003 A1 Oct. 31, 2024

(51) Int. Cl.
*G06F 8/61* (2018.01)
*G06F 8/71* (2018.01)
*G06F 16/16* (2019.01)

(52) U.S. Cl.
CPC .................. *G06F 8/61* (2013.01); *G06F 8/71* (2013.01); *G06F 16/16* (2019.01)

(58) Field of Classification Search
CPC ............... G06F 8/61; G06F 8/71; G06F 16/16
See application file for complete search history.

(56) References Cited

U.S. PATENT DOCUMENTS 5,956,513 A * 9/1999 McLain, Jr. .............. G06F 8/71 717/145
8,291,372 B2 * 10/2012 Dangeville ............... G06F 8/10 717/103
11,157,267 B1 * 10/2021 Li ............................. G06F 8/70
(Continued)

FOREIGN PATENT DOCUMENTS

CN 114327566 A 4/2022

OTHER PUBLICATIONS

"nirvdrum, svn2git, 2016, https://github.com/nirvdrum/svn2git/blob/master/README.markdown" (Year: 2016).*
(Continued)

*Primary Examiner* — Wei Y Mui
*Assistant Examiner* — Vivian Weijia Duan
(74) *Attorney, Agent, or Firm* — Lily Neff

(57) ABSTRACT

A method, computer program product, and computer system for migration from a centralized version control system to a distributed version control system. The method includes defining a set of applications of an installation that is to be migrated from a centralized version control system, each application including programs for executing tasks with program calls used to communicate between the programs. The method provides distributed version control repositories for each of the applications. The method accesses source code for the installation, including metadata relating to include files and data structures used by programs in the source code. For an identified include file, it is determined if there is a single owning application and this information and the include file is sent to a distributed version control repository for the owning application.

15 Claims, 5 Drawing Sheets

(56) References Cited

U.S. PATENT DOCUMENTS

| | | | |
|---|---|---|---|
| 2008/0027940 | A1 | 1/2008 | Canning |
| 2017/0372068 | A1 | 12/2017 | Zimmerman |

OTHER PUBLICATIONS

"IBM, "IBM Application Discovery for IBM Z", 2021" (Year: 2021).*

"Singh, V., Aggarwal, A., Kumar, A., Sanwal, S., "The Transition from Centralized (Subversion) VCS to Decentralized (Git) VCS: A Holistic Approach", 2019" (Year: 2019).*

Microsoft, "Migrate to Git From Centralized Version Control", Microsoft, [accessed Oct. 6, 2022], 6 pgs., Retrieved from the Internet: <https://learn.microsoft.com/en-us/devops/develop/git/centralized-to-git>.

Prana, et al., "Categorizing the Content of GitHub Readme Files", arXiv:1802.06997v2 [cs.SE], Jul. 30, 2018, 37 pgs.

Sharma, et al., "Cataloging GitHub Repositories", EASE '17 Proceedings of the 21st Conference on Evaluation and Assessment in Software Engineering, New York, Jun. 15-16, 2017, pp. 314-319, Research Collection School of Information Systems, Singapore Management University, <https://ink.library.smu.edu.sg/cgi/viewcontent.cgi?article=4718&context=sis_research>.

* cited by examiner

MIGRATION FROM CENTRALIZED VERSION CONTROL SYSTEM TO A DISTRIBUTED VERSION CONTROL SYSTEM

BACKGROUND

The present invention relates to migration of version control systems in a computer system, and more specifically, to migration from a centralized version control computer system to a distributed version control computer system having distributed version control repositories.

In a computer environment, enterprise organizations with mainframe installations and large custom code bases, such as banks and insurance companies, traditionally use a centralized version control system (also referred to as Source Control Management system (SCM)). This use is often across enterprise mainframe installations, and it is to allow consistent development practices and solutions for the computer environment.

Mainframe applications of enterprise organizations have been developed over the past decades and are usually stored in a single version control system. Developers and the build process can access any source code file of a given business unit or more. This provides advantages, but also makes the technical boundaries of applications blurry and hard to define.

To work with the distributed version control systems, such as Git (Git is a registered trademark of Software Freedom Conservancy, Inc.), enterprise organizations are breaking the current code base from monoliths into smaller versions of their repositories. This is particularly beneficial when adopting new development practices. The breakdown typically corresponds to application components. To break a monolith into smaller components, some work must be performed to understand where each artifact belongs, without breaking the application's logic and putting the delivery process at risk.

A problem currently facing enterprise organizations, is identifying the owner of a source code elements (i.e. programs). This identification is easier for manually maintained and managed inventories, but it is much more difficult for shared components such as files that define data structures that are used and passed between multiple programs. These files, sometimes designated as "include files", can either be at the same location as the programs or reside in another location. In either case, due to their shared nature, it is harder to define the ownership of these files.

Enterprise organizations have in the past investigated the manual and half-automated analysis of the application boundaries to gain better insights, but most attempts have failed due to the time and effort it takes to manually analyze and classify the existing large code base. This effort was not sufficiently beneficial as relating to a monolithic, single version control system. Products supporting such analysis activities are static code analysis tools that help in understanding technical dependencies. However, they do not support the classification to include file usage across application boundaries.

SUMMARY

According to an aspect of the present invention there is provided a system, computer program product and a computer-implemented method for migration from a centralized version control system to a distributed version control system, said method comprising: defining a set of applications of an installation that is to be migrated from a centralized version control system. Each application includes programs for executing tasks and program calls used to communicate between them. A plurality of distributed version control repositories is provided for each of the applications. The source code related to the installation I analyzed by accessing source code metadata and any related data structure files used by a plurality of programs associated with the source code. The results are provided to a relational database and at least one include file is identified from the relational database and file usage. It is then determined, for each include file identified, whether there is a single owning application and this is then provided to a distributed version control repository of the owning application.

BRIEF DESCRIPTION OF THE DRAWINGS

Embodiments of the present invention will now be described, by way of example only, with reference to the accompanying drawings.

Figure 1:
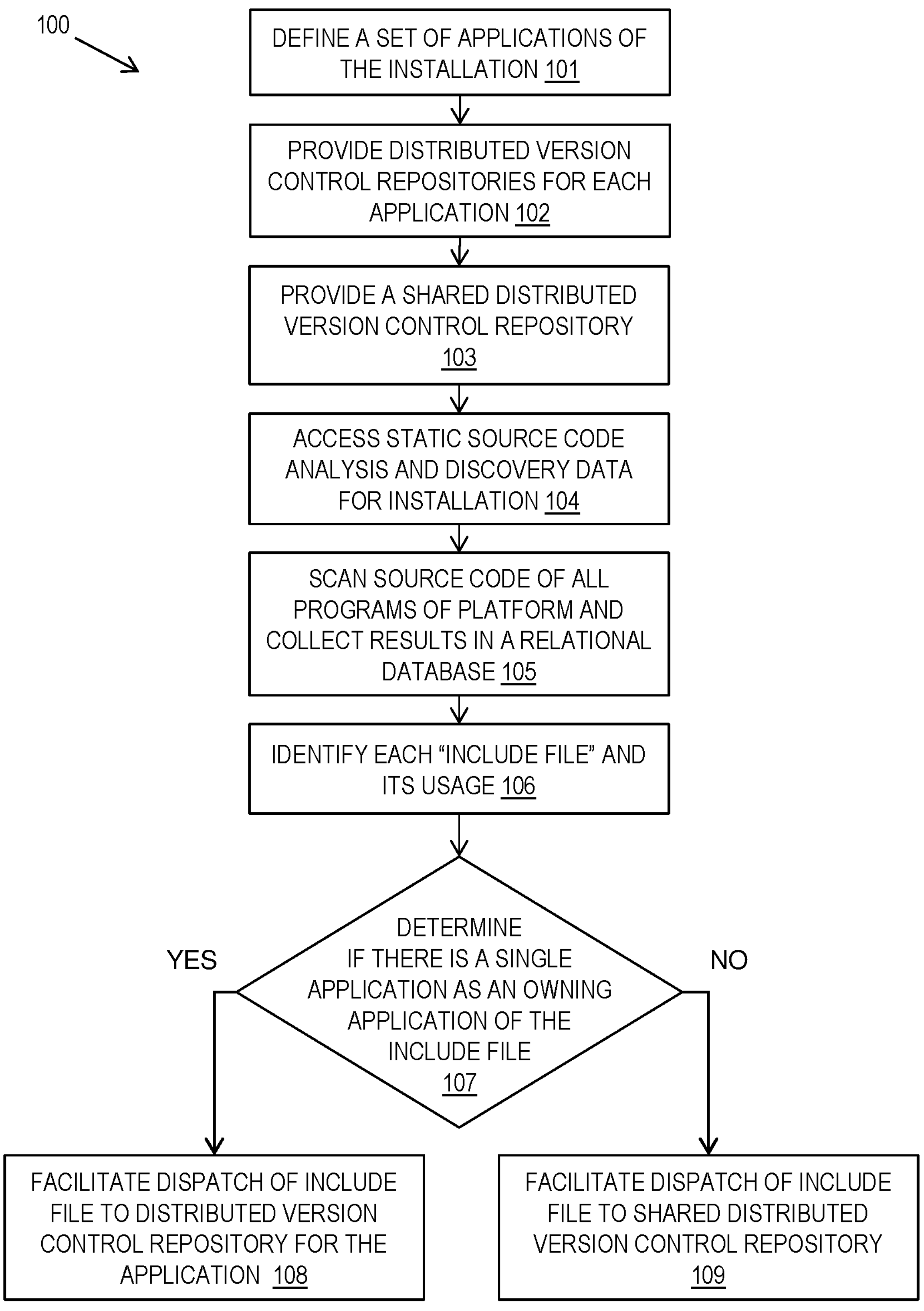
FIG. 1 is a flow diagram of an example embodiment of a method in accordance with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The described method and system are used when migrating a centralized version control system for an installation having a monolith source code base into multiple version control repositories corresponding to application components in a computer environment. In one example, the installation may be a mainframe installation using mainframe languages in the source code.

In one embodiment, the method and system involve the identification and classification of specific files in the source code. In one embodiment these files may be designated as include files which are referenced via include directives. During the compilation process, the include directive causes the content of the include file to be inserted into the source code, include files are files that either are part of the application or are to be included from another location or source and that define data structures. Some of the include files define communication data structures that are passed between programs and that act as an interface specification.

With distributed development languages, application dependencies are addressed by including or referencing executable libraries built by external applications. For example, in Java (Java is a trademark of Oracle, Inc.), the developer and the build process reference a set of external Java ARchive (JAR) files configured in the build path. With most distributed development languages, the executable libraries expose the interfaces of the application.

With traditional mainframe languages like COBOL (COBOL is a trademark of International Business Machines Corporation), IBM PL/1 (IBM PL/1 is a trademark of International Business Machines Corporation) or Assembler, data structures are commonly defined in include files including communication data structures, for example, a COBOL copybook, a PL/1 include file or Assembly Macro.

In the specific case of programs exchanging data, the consumer and the provider agree on a common format, which is by convention defined in an include file, which is then shared among all the stakeholders. This transforms the status of the include files into a special status. In other words, these files act as an interface defining the data structure passed between programs and are referred to as "communication include files". These data definitions are only available at the source code level and not in any produced binary. Consequently, the include files become available both to the developers as well as to the build process (i.e. the compiler).

The organization and process flow of the include files become a key activity, especially when migrating to a distributed version control system (as it is necessary to understand how include files are used by applications). An analysis is required to determine if a given include file defines an interface between applications and is therefore shared between applications or if it is used by one application only. This analysis determines how the include files are dispatched to application owning distributed version control repositories and a shared distributed version control repository.

The described method aims to understand the use of include files and automate their classification and their dispatching into distributed version control repositories. The result of this method leads to an optimized composition of the distributed repositories.

Referring to FIG. 1, provides a flowchart depiction of a process 100 used for classifying and dispatching one or more include files and incorporating them into one or more application-owned distributed version control repositories. In one embodiment, this may be carried out during a migration of a centralized version control system as part of a distributed version control repository.

In Step 101, a set of applications for an installation that is to be migrated from a centralized version control system is defined. In one embodiment, each application may include programs for executing tasks with program calls, such as used to communicate between one or more programs.

In Step 102 a distributed version control repository is provided for each of the applications. In one embodiment, this includes Step 103 that provides a shared distributed version control repository for files that are shared between applications.

In Step 104 access is made to the static source code. This is to provide an analysis and discovery of data for completing the installation, The source code may be a monolithic source code of an installation for which version control is being migrated to a distributed version control system. For example, the installation may be for a mainframe platform. The analysis then of the source code may include metadata relating to the include files that define data structures used by programs in the source code. The metadata may also include directives relating to or referencing the include files, calls between one or more programs, and details about how variables are passed between one or more programs.

The method is based on the static source code analysis and discovery data of software artifacts. For example, IBM Application Discovery and Delivery Intelligence (IBM ADDI is a trademark of International Business Machines Corporation) solution may be used. The method may access collected information about the source code to build an inventory of software artifacts of mainframe applications.

In Step 105 the source code of all the programs developed for this installation are scanned. In one embodiment, any collected results may be stored for further processing in a storage location accessible through programmatic methods, such as a relational database.

In Step 106, each include file is identified. The identification may be made from a list of all include files and may check how these include files are used by the programs of the applications. include files are defined, in one embodiment, as specific files defining data structures used by programs of the applications for the installation.

To allow classification and to facilitate dispatching of include files, the process requires that programs are mapped to applications. This may happen based on commonly existing information such as naming conventions or inventories. However, because of the shared nature of most include files, naming conventions or rules do not apply with sufficient accuracy and the information is not enough reliable to map those to applications. Therefore, the following process steps are used to ensure the accuracy.

In Step 107, a decision is made to determine of interconnectivity. So as for an identified include file, Step 107 determines 107 if there is a single application as an owning application for the include file. If there is a single owning application of the include file, the process moves to Step 108 otherwise it moves to Step 109.

Step 108 facilitates the dispatch of the include file to a distributed version control repository for the owning application. If there is not a single owning application of the include file and it is determined that the include file is shared between more than one application, Step 109 facilitates the dispatch of the include file to the shared distributed version control repository.

As described in more detail below with reference to FIG. 2, the process 200 may determine if an identified include files is a "communication include file" in the form of a communication definition data structure for communication between programs. A "communication include file" contributes the data definition involved in program calls and provides a communication data definition. Other non-communication include files define data structures which are not used in communications between programs (i.e., file record structure, database record structure, etc.).

Communication include files are identified in order to analyze whether there is an owning application of the communication include file or if it is a shared include file. It may be determined if there is a single application that service providing programs using the communication data structure of the communication include file belong to in order to allocate the application as the owning application of the include file. Referring to FIG. 2, a flowchart illustration of the process 200 depicts an embodiment of this scenario.

As described above in relation to FIG. 1, the process leverages data collected by static source code analysis solutions, such as IBM ADDI, whose purpose is to discover and to build an inventory of software artifacts of installations, such as mainframe platforms. The source code of all the programs developed for the installation is scanned and the collected results stored into a relational database, for further processing. Similar solutions exist on the market, collecting equivalent information.

From a defined set of applications having programs within the applications, the process 200 establishes in Step 201 a list of all include files and then checks how these include files are used by the programs. A next include file in the list is identified in Step 202.

In Step 203, if is determined if the include file is a communication include file between programs. Either the include file is a communication include file and contributes the data definition involved in program calls and provides a communication data definition (Step 206), or the include file is used for another purpose (Step 204).

When the include file is not defining a communication data structure, it is classified in Step 204 based on its usage in programs as either "private" or "shared" as follows:

- Private: If the include file is only used within the defined scope of an application, the include file is classified as "private" to that particular application. (This configuration can be observed for include file INC1 341 in FIG. 3 below.)
- Shared: If the include file is referenced by several applications, it is assumed to be a shared include file and classified as "shared". (This configuration can be observed for include file INC6 346 in FIG. 3 below.)

Furthermore, in Step 205, the application is designated (nominated) as the owner of a "private" include file and does not nominate an owner of the "shared" include file.

Alternatively, as illustrated in Step 203, when the include file defines a communication data structure used between programs as determined an additional analysis is performed in Step 206 for the include file defining the data structures used in calls between programs.

For each program call using the communication data structure defined in the include file, the process identifies in Step 207 the provider service and the consumer service.

In Step 208, the process classifies the communication include file as "private", "public", or "shared" as follows:

- When all the providers and consumers identified in the program calls belong to the same application, the communication include file is classified as "private" within the application and this application is nominated as the owning application.
- When all providers identified in the program calls belong to the same application and consumers are from different applications, the include file is classified as a "public" include file and this application is nominated as the owning application. (This configuration can be observed for include file INC2 342 in FIG. 3 below.)
- When the providers identified in the program calls belong to different applications or the target program of the call cannot be found in the inventory, the include file is classified as a "shared" include file. (This configuration can be observed for include files INC3 343 and INC4 344 in FIG. 3 below.)

In this way, in Step 209, the process designates (nominates) the application as the owner of a "private" or "public" communication include file and does not nominate an owner of the "shared" communication include file.

In Step 210, the include file with the classification is dispatched to the appropriate application-owned distributed repository. The "shared" include files are not assigned to an owning application, and may be grouped in a unique shared distributed version control repository.

The classifications are used by the repositories to identify the nature of the include files. "Private" and "public" include files have a known, designated owner (application and/or team). They belong to a given application and can get along with the application in the same repository. "Private" include files are files only used by the owning application, "public" include files are also used by other applications.

To ensure accurate results and correct classification of include files, this process is applied over the entire scope of the information technology system.

The outcome of the process 200 is the classification and the dispatching of all include files into the distributed repositories of their owning applications. The method includes the identification and classification of communication interfaces that are defined in include files. These results support the organization and definition of the distributed repositories of mainframe applications. The method increases the reliability of the migration of legacy version control systems to distributed version control repositories. The method may be provided as a standalone utility or may be integrated into a larger solution.

Figure 2:
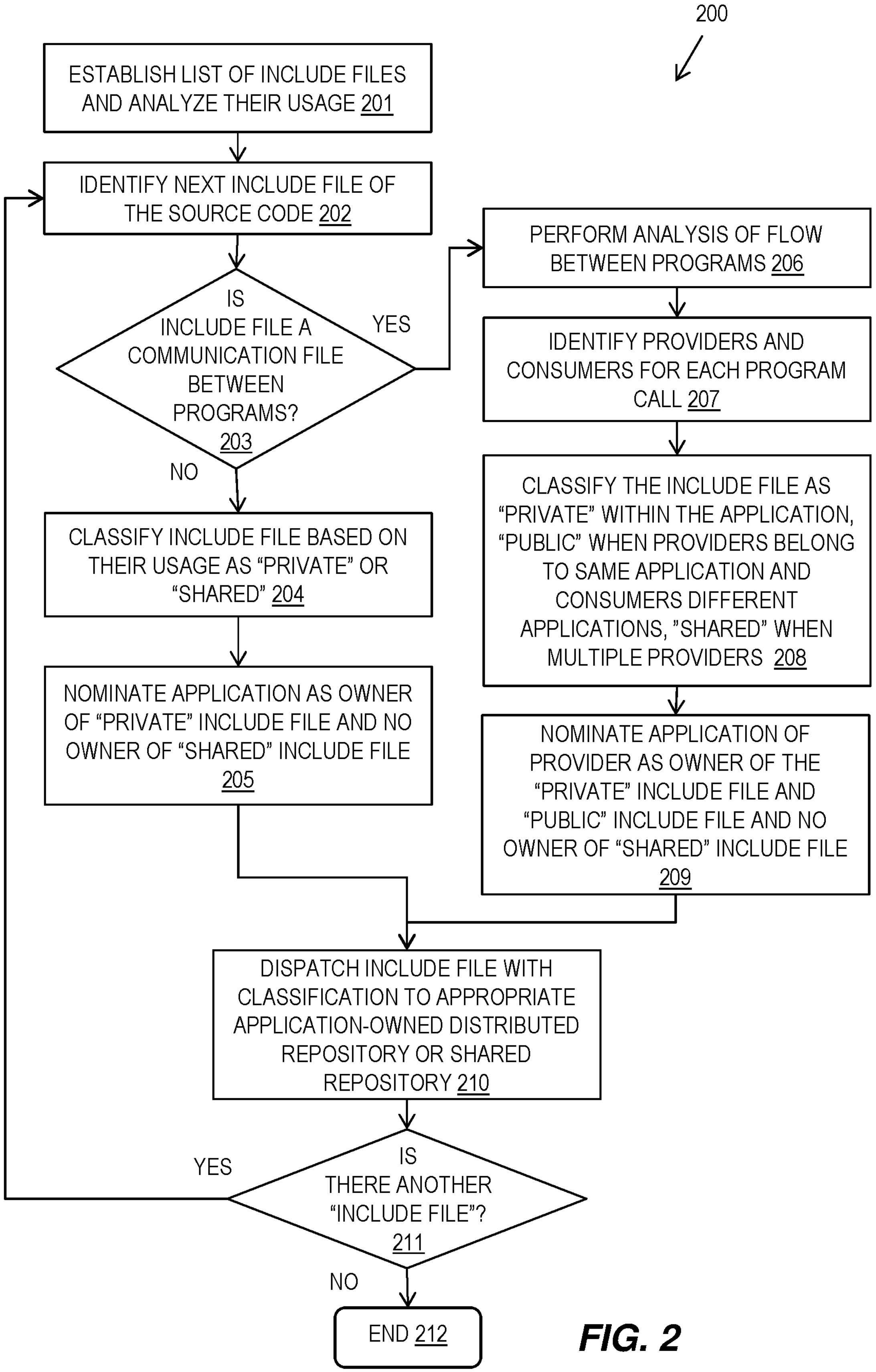
FIG. 2 is a flow diagram of another example embodiment of a method in accordance with embodiments of the present invention.
Figure 3:
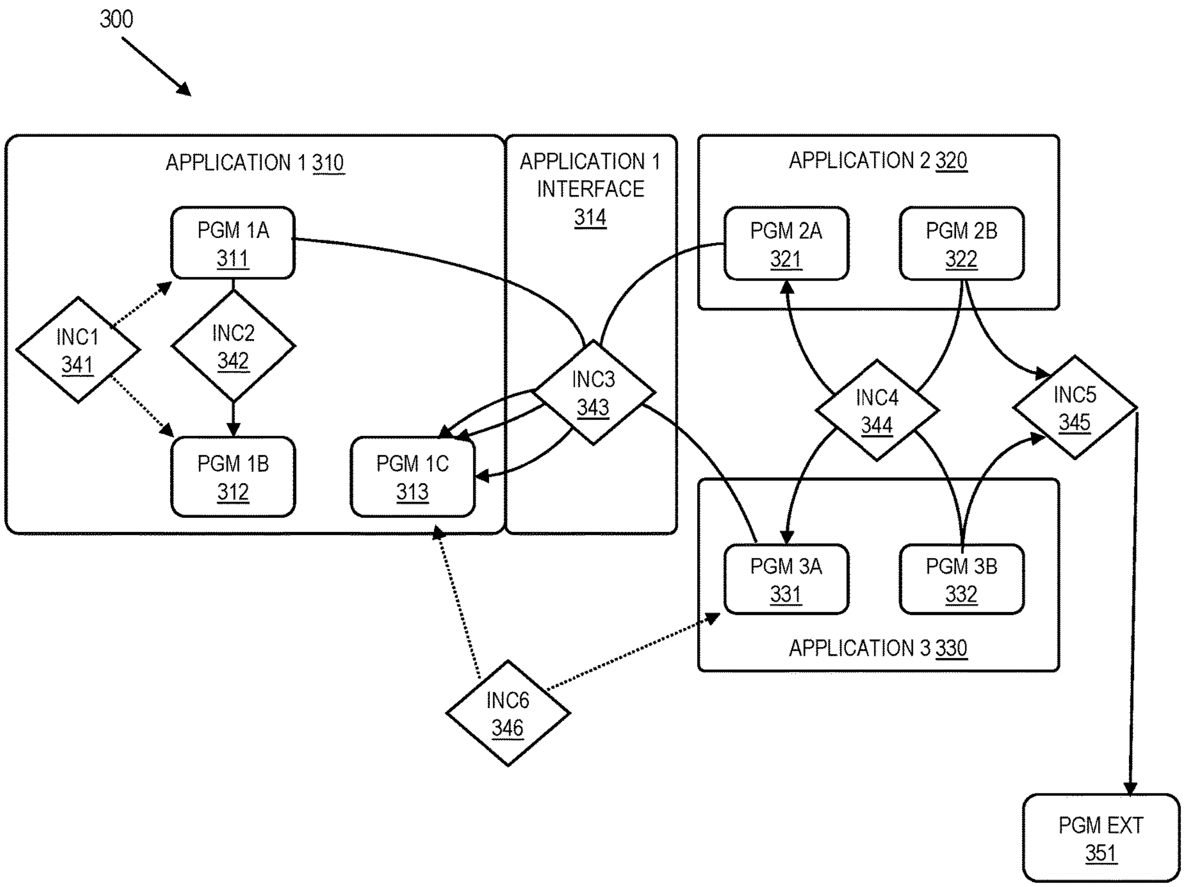
FIG. 3 is a schematic diagram of an example embodiment of a scenario of the present invention.

FIG. 3 is a provides a schematic diagram 300 illustrating an example of the scenarios in FIGS. 1 and 2. In FIG. 3, an Application 1 310 is provided that includes Program PGM1A 311, Program PGM1B 312, Program PGM1C 313 and application interfaces 314. Application 2 320 is also provided that includes Program PGM2A 321 and Program PGM2B 322. Application 3 330 includes Program PGM3A 331 and Program PGM3B 332.

The schematic diagram 300, in one embodiment, provides some examples of include files in the form of INC1 341, INC2 342, INC3 343, INC4 344, INC5 345, and INC6 346. The identification and classification process helps as discussed in FIGS. 1 and 2 to discover the following.

Include file INC1 341 is referenced by Program PGM1A 311 and Program PGM1B 312 but is not used in a Program call. INC1 341 does not define a communication interface. While it is only used by programs belonging to Application 1 310, it is classified as a private include file.

Include file INC2 342 is used in call from Program PGM1A 311 to Program PGM1B 312. INC2 342 is classified as a private communication include file of Application 1 310, as both the calling program and the called program belong to the same application.

Include file INC3 343 is used in calls from Programs PGM1A 311, PGM2A 321 and PGM3A 331 to Program PGM1C 313. INC3 343 is classified as a public communication include file of Application 1 310, as the called program (provider) belongs to this application.

Include file INC4 344 is used in calls from Program PGM2B 322 to program PGM3A 331 and from Program PGM3B 332 to Program PGM2A 321. INC4 344 is classified as a shared communication include file, as the called programs belong to different applications. No application can be designated as the owner of this include file.

Include file INC5 345 is used in calls from Programs PGM2B 322 and PGM3B 332, but the target program in calls cannot be determined shown by Program PGMEXT 351. INC5 345 is classified as a shared communication include file. No application can be designated as the owner of this include file.

Include file INC6 346 is referenced by Program PGM1C 313 and Program PGM3A 331 but is not used in a program call. Include file INC6 346 does not define a communication interface. As it is used by programs belonging to different applications (Application 1 310 and Application 3 330), it is classified as a shared include file.

Figure 4:
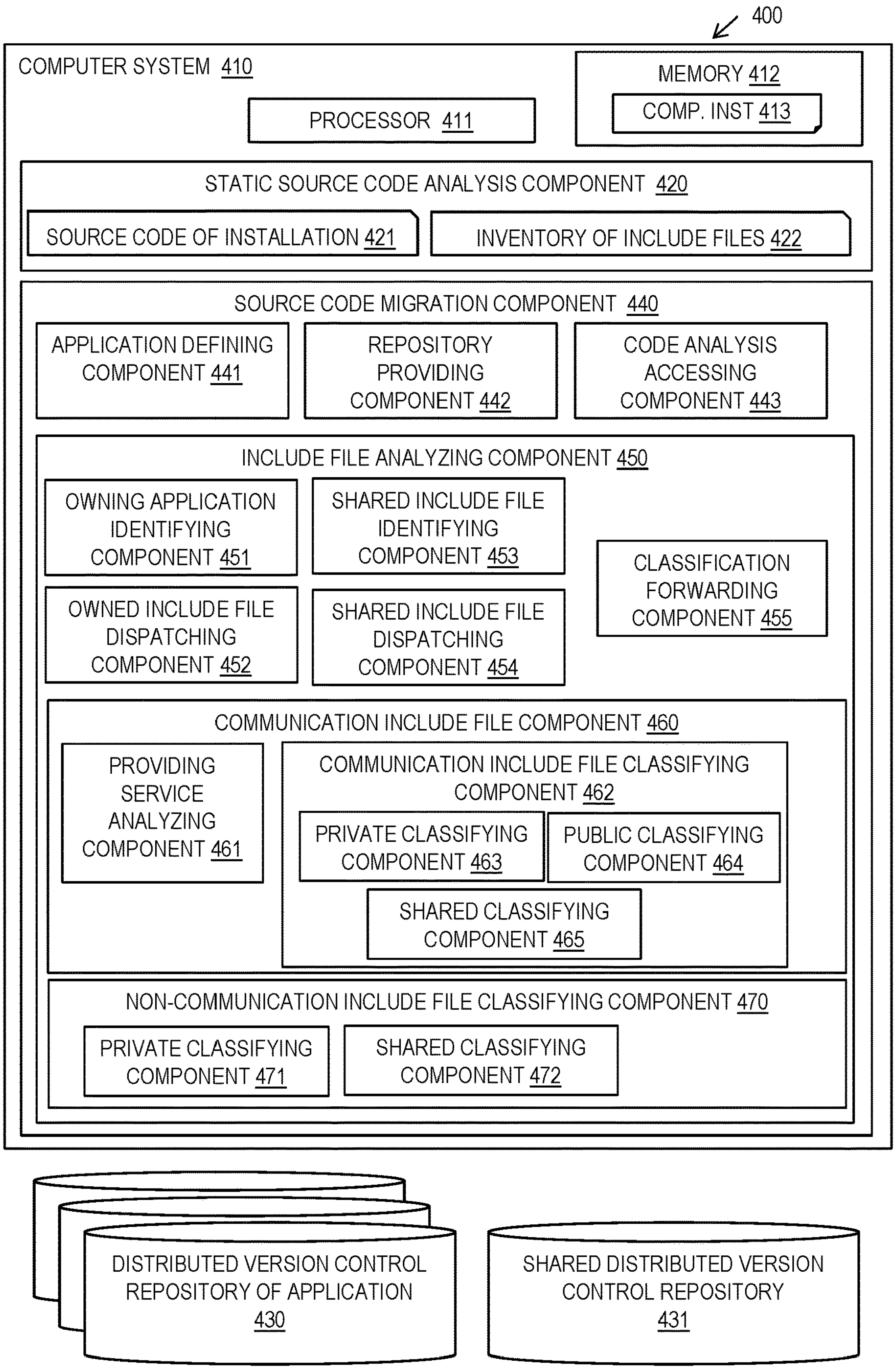
FIG. 4 is block diagram of an example embodiment of a system in accordance with embodiments of the present invention.

FIG. 4, provides a block diagram of a networked system 400 as can be used to implement one embodiment. The system 400 includes a variety of different components such as a computing system 410 that include at least one processor 411, a hardware module, or a circuit for executing the functions of the described components which may be software units executing on the at least one processor. Multiple processors running parallel processing threads may be provided enabling parallel processing of some or all of the functions of the components. Memory 412 may be configured to provide computer instructions 413 to the at least one processor 411 to carry out the functionality of the components.

The computer system 410 provides a source code migration component 440 for migrating include files to distributed version control repositories including application owned distributed version control repositories 430 and a shared distributed version control repository 431.

The computer system 410 may include a static source code analysis component 420 that may access a source code 421 of an installation and may generate an inventory 422 of include files. The static source code analysis component 420 may be provided on a separate computer system 410 to the source file migration component 440 which may access the inventory of include files 422 for analysis.

A source file migration component 440 is provided that may include an application defining component 441 for defining a set of applications of an installation that is to be migrated from a centralized version control system (not illustrated in FIG. 4), each application including programs for executing tasks with program calls used to communicate between the programs.

The source file migration component 440 may include a repository providing component 442 for providing distributed version control repositories for each of the applications 430 and a shared distributed version control repository 431. The source file migration component 440 may include a code analysis accessing component 443 for accessing analyzed static source code of the installation from the static source code analysis component 420, including metadata relating to include files defining data structures used by programs in the source code.

The source file migration component 440 may include an include file analyzing component 450 for analyzing an identified include file. The include file analyzing component 450 may include an owning application identifying component 451 for determining if there is a single application as an owning application of the include file and an owned include file dispatching component 452 for facilitating the dispatching of the include file to a distributed version control repository for the owning application.

The include file analyzing component 450 may include a shared include file identifying component 453 for determining if the include file is shared between more than one application and a shared include file dispatching component 454 for facilitating the dispatching of the include file to the shared distributed version control repository.

The include file analyzing component 450 may further include a communication include file component 460 for determining if the include file is defining a communication data structure used as an interface between programs. The communication include file component 460 may include a providing service analyzing component 461 for determining if there is a single application that service providing programs using the communication data structure belong to in order to allocate the application as the owning application of the include file.

The communication include file component 460 may include a communication include file classifying component 462 including: a private classifying component 463 for classifying a private data structure when the service providing programs and the service consuming programs all belong to the owning application; a public classifying component for classifying a public data structure when the service providing programs belong to the owning application and the service consuming programs belong to at least one different application 464; and a shared classifying component 465 for classifying a shared data structure when the service providing programs are used by more than one application. The shared classifying component 465 also classifies include files as shared when the target program of the include file cannot be identified.

The include file analyzing component 450 may further include a non-communication include file classifying component 470 including a private classifying component 471 for classifying the include file as a private data structure and a shared classifying component 472 for classifying the include file as a shared data structure.

The include file analyzing component 450 may include a classification forwarding component 455 for forwarding the classification with the include file to the distributed version control repository of the owning application or to the shared distributed version control repository.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 5:
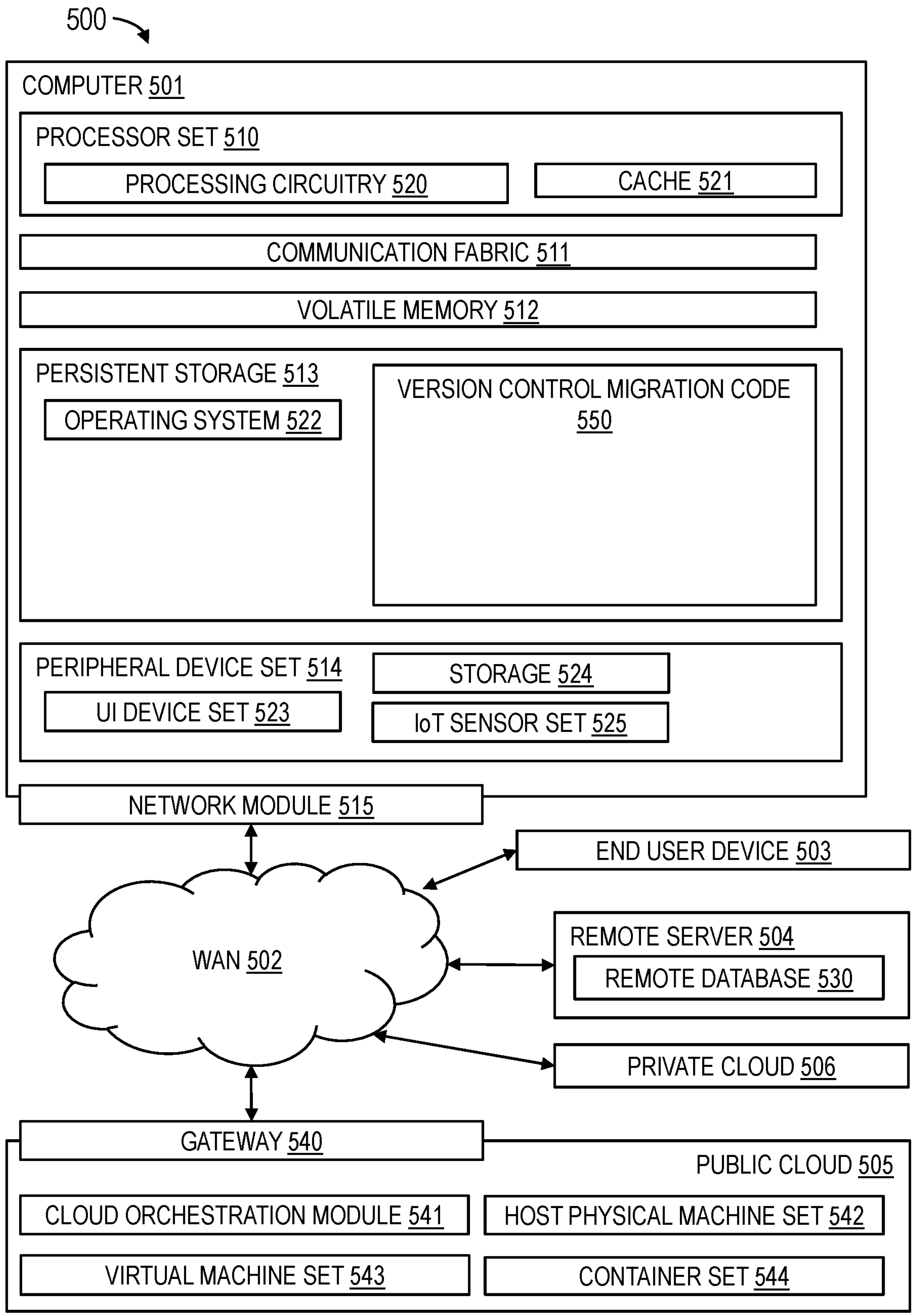
FIG. 5 is a block diagram of an example embodiment of a computing environment for the execution of at least some of the computer code involved in performing the present invention.

In FIG. 5, the block diagram of a computing environment 500 is provided. The computing environment 500 includes a variety of functions including providing code for a version control migration system 550. Computing environment 500 also includes a computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 550, as identified above), peripheral device set 514 (including user interface (UI) device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

COMPUTER 501 may take the form of a desktop computer, laptop computer, mainframe computer, quantum computer or any other form of computer now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in block 550 in persistent storage 513.

COMMUNICATION FABRIC 511 is the signal conduction path that allows the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, volatile memory 512 is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface-type operating systems that employ a kernel. The code included in block 550 typically includes at least some of the computer code involved in performing the inventive methods.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for migration from a centralized version control system to a distributed version control system, said method comprising:

defining a set of applications for an installation that is to be migrated from a centralized version control system, wherein each application includes a plurality of programs for executing tasks and associated program calls for communication between the programs;

providing a plurality of distributed version control repositories for each of the applications;

analyzing a source code related to the installation, by accessing source code metadata and any related data structure files used by a plurality of programs associated with the source code;

providing results of said source code being analyzed in a relational database;

identifying at least one include file from said relational database based on file usage and associated collected results;

determining for each include file identified whether there is a single owning application;

determining when any include files have a communication data structure that is used as an interface between programs and any associated owning applications;

determining if any include files are shared between more than one application when there is no identified owning application;

classifying any include file for the communication data structure as private when a service providing program and a service consuming program exist that belong to a same owning application;

providing any include files that are shared between more than one application to a shared distributed version control repository, wherein for an identified include file for which a target program is not included in the accessed metadata, the include file is classified as a shared include file and a classification related to the communication data structure is forwarded with the include file to the shared distributed version control repository;

providing any include file identified as having an owning application to a distributed version control repository of the owning application; and migrating the set of applications for the installation from the centralized version control system for executing tasks and associated program calls for communication between the programs.

2. The method of claim 1, wherein the include file has a communication data structure and an owning application, further comprising:

classifying an include file as a public include file when a service providing program belongs to the owning application and a plurality of service consuming programs belong to at least a different application.

3. The method of claim 2, further comprising forwarding the classification of the include file to the distributed version control repository of the owning application.

4. The method of claim 1, further comprising:

determining when the include file does not have a communication data structure or an owning application and classifying the include file as a private include file; and forwarding the classification with the private include file to the distributed version control repository of the owning application.

5. The method of claim 1, wherein for an identified include file that is shared between applications, the identified include file is classified as a shared include file and the classification is forwarded with the include file to a shared distributed version control repository.

6. The method of claim 1, wherein any data related to the source code relating to the programs related to the installation is stored in a storage location.

7. A system for migration from a centralized version control system to a distributed version control system, comprising:

a processor and a memory configured to provide computer program instructions to the processor to execute a function of a plurality of components:

an application defining component for defining a set of applications for an installation that is to be migrated from a centralized version control system, each application including a plurality of programs for executing tasks and associated program calls used to communicate between the programs;

a plurality of distributed version control repositories for each of the applications;

a code analysis component for analyzing a source code related to the installation, by accessing source code metadata and any related data structure files used by a plurality of programs associated with the source code;

an include file analyzing component for identifying at least one include file associated with the analyzed source code analyzing an identified include file, wherein said include file analyzing component further determines if any include file has an associated single owning application;

a classifying component for classifying a communication data structure as private, wherein a private classification denotes when a service providing program and a service consuming program belong to a same owning application;

the classifying component classifying a communication data structure as a public include file when the service providing program and the service consuming program belong to different applications; and the classifying component classifying a communication data structure as a shared include file when the service providing program is used by more than one application or when a target program is not found through metadata, wherein, the include file classified as a shared include file is forwarded with the include file to the shared distributed version control repository;

a dispatching component for sending any include files having the single owning application to a distributed version control repository for the owning application; and an executing component for migrating the set of applications for the installation from the centralized version control system for executing tasks and associated program calls for communication between the programs.

8. The system of claim 7, wherein the include file analyzing component has a shared include file identifying component for determining if the include file is shared between more than one application; and a shared include file dispatching component for sending the shared include file to a shared distributed version control repository.

9. The system of claim 7, wherein the include file analyzing component determines if any include file defines a communication data structure used as an interface between programs; and if any such identified include file is associated with an owning application.

10. The system of claim 9, wherein a classification forwarding component is provided for forwarding the classification with the include file when sent to a repository.

11. The system of claim 9, wherein a non-communication include file classifying component is provided for classifying the include file as a private include file or a shared include file.

12. The system of claim 7, wherein a plurality of multiple distributed version control repositories are provided for any owning applications.

13. The system of claim 7, wherein the system is a standalone utility for handling include files.

14. The system of claim 7, wherein the system is integrated into a migration system for migrating a centralized version control system to a distributed version control system.

15. A computer program product for migration from a centralized version control system to a distributed version control system, the computer program product comprising a computer readable storage medium having program instructions embodied therewith, the program instructions executable by a processor to cause the processor to:

define a set of applications for an installation that is to be migrated from a centralized version control system, wherein each application includes a plurality of programs for executing tasks and associated program calls for communication between the programs;

provide a plurality of distributed version control repositories for each of the applications;

analyze a source code related to the installation, by accessing source code metadata and any related data structure files used by a plurality of programs associated with the source code;

provide results of said source code being analyzed in a relational database;

identifying at least one include file from said relational database based on file usage and associated collected results;

determine for each include file identified whether there is a single owning application;

determine when any include files have a communication data structure that is used as an interface between programs and any associated owning applications;

determine if any include files are shared between more than one application when there is no identified owning application;

classify any include file for the communication data structure as private when a service providing program and a service consuming program exist that belong to a same owning application;

provide any include files that are shared between more than one application to a shared distributed version control repository, wherein for an identified include file for which a target program is not included in the accessed metadata, the include file is classified as a shared include file and a classification related to the communication data structure is forwarded with the include file to the shared distributed version control repository;

provide any include file identified as having an owning application to a distributed version control repository of the owning application; and migrate the set of applications for the installation from the centralized version control system for executing tasks and associated program calls for communication between the programs.

* * * * *